United States Patent [19]

Laghi

[11] Patent Number: 5,087,190
[45] Date of Patent: Feb. 11, 1992

[54] MULTI PLUNGER MOLDING MACHINE FOR LIQUID SILICONE RUBBER

[76] Inventor: Aldo A. Laghi, 13 Meridian La., Ballston Lake, N.Y. 12019

[21] Appl. No.: 633,633

[22] Filed: Dec. 21, 1990

[51] Int. Cl.⁵ .............................................. B29C 45/80
[52] U.S. Cl. ................................. 425/145; 425/159; 425/542; 425/588
[58] Field of Search ............... 425/145, 542, 543, 588, 425/159; 264/328.8, 328.2

[56] References Cited

U.S. PATENT DOCUMENTS

| | | | |
|---|---|---|---|
| 2,478,013 | 8/1949 | Roddy | 264/328.8 X |
| 3,417,433 | 12/1968 | Teraoka | 264/328.8 X |
| 4,161,380 | 7/1979 | Bishop | 425/145 |
| 4,389,358 | 6/1983 | Hendry | 425/588 |
| 4,402,657 | 9/1983 | Laghi | 425/543 X |
| 4,402,661 | 9/1983 | Laghi | 425/543 |
| 4,436,496 | 3/1984 | Laghi | 425/543 |
| 4,545,952 | 10/1985 | Laghi | 264/328.2 |
| 4,550,006 | 10/1985 | Laghi | 264/328.2 |
| 4,752,201 | 6/1988 | Kauffman et al. | 425/145 |
| 4,767,300 | 8/1988 | Buja et al. | 425/145 X |

*Primary Examiner*—Richard L. Chiesa
*Attorney, Agent, or Firm*—Joseph C. Mason, Jr.; Ronald E. Smith

[57] ABSTRACT

A multi-plunger molding machine having a dedicated injection circuit provided for each cavity of a plurality of cavities. Each injection circuit includes a nozzle, an injection plunger, an adjustable control cylinder dedicated to each injection plunger, a pressure control valve and a flow control valve. In this way, the quality of shot introduced into each cavity is independently controllable. A process computer and timers are used to open and close various mechanical valves in accordance with a predetermined sequence. A first timer insures that each shot undergoes a complete thermal expansion before curing begins. A second timer insures that each product is fully cured and that no product is discharged from a cavity prematurely. A flexible conduit is provided between each injection circuit and its associated nozzle so that the machine is free of runners and the concomitant waste of components is eliminated.

14 Claims, 1 Drawing Sheet

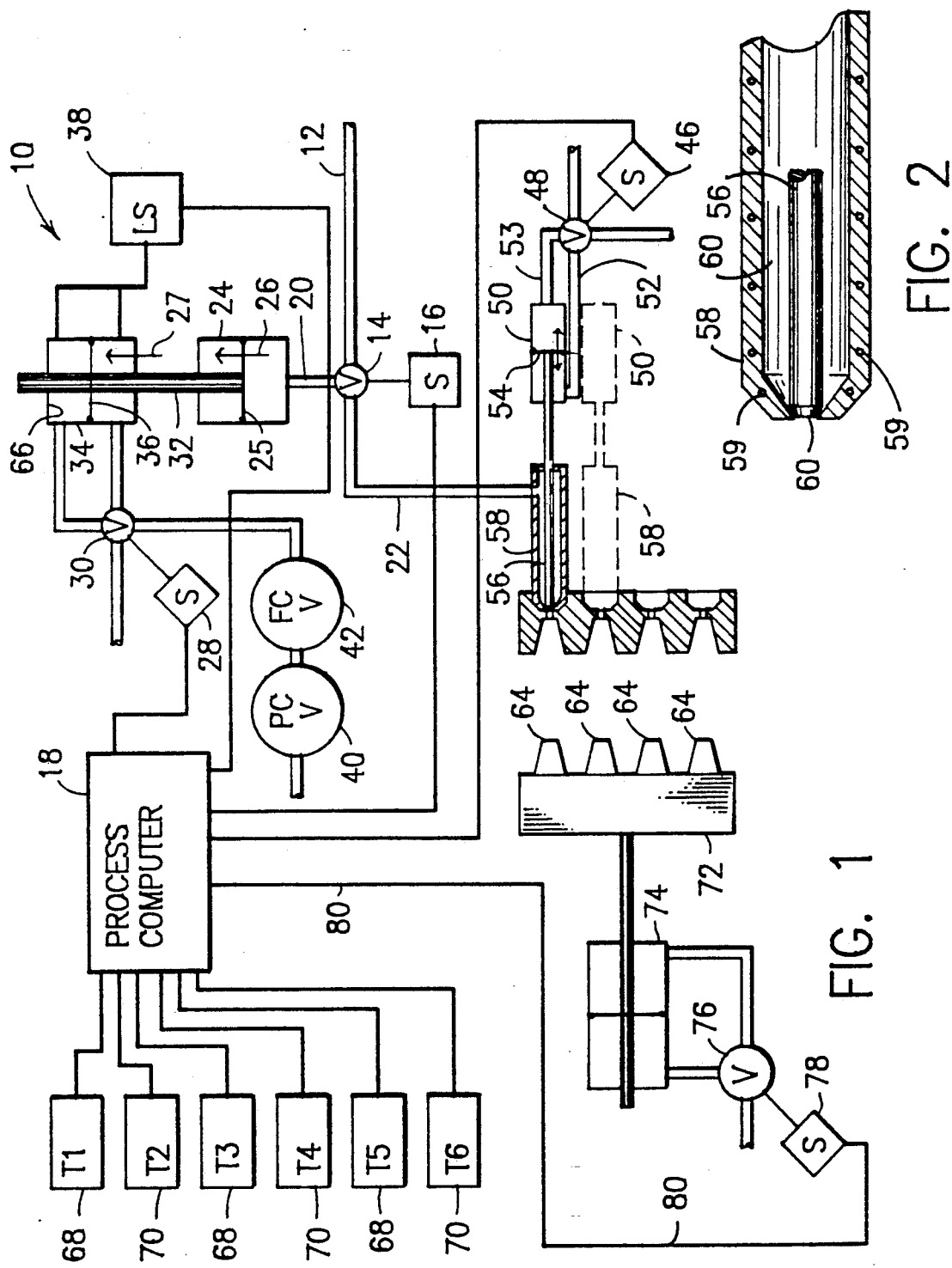

MULTI PLUNGER MOLDING MACHINE FOR LIQUID SILICONE RUBBER

TECHNICAL FIELD

This invention relates, generally, to machines for molding a liquid injection molding composition. More particularly, it relates to a multi-plunger machine where the volume, speed and pressure of silicone introduced into a plurality of cavities are individually controlled for each cavity, independently of all other cavities.

BACKGROUND ART

Molding machines for molding multiple items simultaneously are well known. U.S. Pat. No. 4,545,952 to the present inventor shows a typical machine of this type. Other U.S. patents held by the present inventor which are also in the field of this invention include U.S. Pat. Nos. 4,402,657, 4,402,661, 4,550,006, and 4,436,496.

All of the known machines in this field have utility, but they suffer from a common drawback: the multiple cavities are fed with liquid silicone rubber from a common manifold. Thus, no cavity receives individual attention, so to speak. The volume of silicone introduced into each cavity is the same, as is the speed of silicone flow into each cavity and the pressure at which the injection is made.

The process of injecting liquid silicone rubber into the separate cavities at the same volume, speed, pressure and temperature usually results in product of differing quality.

This is because no two cavities in a multi-cavity mold are exactly alike, due to the physical limitations encountered in making machined parts. Even very slight structural variances between cavities can cause differences in flow rates from cavity to cavity, different air venting characteristics, different heat distribution, and so on.

Moreover, as the number of cavities increases, the total length of the runners increases, i.e., the distance the material must travel before entering a cavity increases. Thus, the material heats up and begins to cure as it travels toward the cavities. To avoid premature curing, it becomes necessary to speed up the flow rate of the material through the runners, to cool the mold, or both. Rapid injection creates pressure drops in the runners, requiring a higher injection pressure and such higher pressure creates still further problems. Thus, the solution to each problem creates still further problems that require further countermeasures, and so on. In short, complexity leads to more complexity and as more parameters require controlling, the goal of perfection continually eludes the designer. As the number of cavities and hence the length of the runners increases, the range of practical temperatures, pressures, injection rates and the like are narrowed and the task of producing identical high quality parts becomes increasingly difficult.

Accordingly, most inventors have worked tirelessly to refine the existing molding machines. They have devised better runners, better ways of making the initial mixture more homogenous, better means for cooling molds, for controlling injection pressures, and the like. These refinements have led to better and better product, at higher and higher costs.

The conventional wisdom in the industry is that most of the developments in this field are in the past, and that the future holds nothing but continued relatively minor refinements. Thus, nothing in the art suggests that an entirely new, revolutionary approach is possible. On the contrary, every indication is that pioneering breakthroughs will not occur in this field.

DISCLOSURE OF INVENTION

The teachings and suggestions of the well-developed art of multiple cavity molding machines having manifolds and runners are substantially eschewed in the novel method which jettisons the use of such manifolds and runners and which instead provides means for injecting mixed components into multiple cavities in accordance with parameters suitable for each individual cavity independently of all other cavities.

A plurality of highly novel nozzle members are disclosed, each of which is associated with a cavity dedicated to it. Alternatively, a nozzle could be associated with a group or cluster of cavities. Each nozzle has a retractable pin positioned therewithin, and liquid silicone rubber or other mixed component is injected into the cavity by the nozzle only when the pin is retracted. The extension and retraction of the pin is under the control of a process computer. That computer also controls the operation of the other active components of the novel system as well. More particularly, a separate, complete injection circuit is dedicated to each nozzle, and every component of each injection circuit is under the control of the process computer, but each injection circuit is controlled entirely independent of all of the other injection circuits.

It should therefore be understood that the primary object of this invention is to pioneer the art of multiple cavity molding machines having separate injection circuits for each cavity so that the quality of the product produced by the machine is equal or superior to the quality of a product made in a single cavity machine.

These and other important objects, advantages, and features of the invention will become apparent as this description proceeds.

The invention accordingly comprises the features of construction, combination of elements and arrangements of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a diagrammatic representation of the novel machine; and

FIG. 2 is a longitudinal sectional view of the novel nozzle.

BEST MODES FOR CARRYING OUT THE INVENTION

Referring now to FIG. 1, it will there be seen that an exemplary embodiment of the present invention is denoted as a whole by the reference numeral 10.

Liquid silicone rubber is mixed in a liquid silicone rubber dispensing machine, not shown, that forms no part of this invention, per se. It should be noted from the outset that the novel machine disclosed herein also has utility in connection with most two component or multi-component silicones, most two component or multi-component urethanes, most two component or multi-component epoxies, and most single component heat cured polymers. Thus, all references to liquid silicone rubber should be understood as including these and other injectable materials. Moreover, with slight modifications that will be apparent to those of ordinary skill in this art once the novel machine is fully disclosed, this machine can also be used for thermoset plastic molding.

The liquid silicone rubber or similar component is pumped from the dispensing machine, not shown, through supply line 12. A three-way mechanical valve 14, which is positioned in flow-controlling relation to said supply line, is under the control of solenoid 16 which in turn is under the control of process computer 18. Depending upon its configuration, valve 14 can shut off the flow of liquid silicone rubber from the unillustrated dispensing machine, or open conduits 20 and 22 which are in fluid communication with the barrel of an injection plunger 24 and one of the novel nozzles 26, respectively.

The cycle of operation commences with the activation of solenoid 16 and hence valve 14 by process computer 18 so that conduit 20 opens and liquid silicone rubber flows from supply line 12 into the injection plunger 24, driving piston 25 therewithin in the direction of arrow 26. Simultaneously, computer 18 activates a second solenoid, denoted 28, that controls a four-way mechanical valve 30.

Valve 30 opens to a source of fluid and line 29 delivers that fluid to plunger control cylinder 34 as depicted to thereby displace control piston 36 in the direction of arrow 27.

Piston rod 32 upon which control piston 36 is mounted also carries piston 25 of the injection plunger 24; accordingly, injection piston 25 displaces conjointly with control piston 36, as indicated by directional arrow 26. When control piston 36 engages limit switch 38 which is disposed in operative juxtaposition to control cylinder 34, that switch sends a signal in the form of an electrical pulse to computer 18 and the computer reconfigures four-way valve 30 to stop travel of control piston 36 and hence plunger piston 25. The position of limit switch 38 is adjustable by the user of machine 10; thus, a metered amount of liquid silicone rubber (called a "shot" in the industry) is introduced into the barrel of the injection plunger 24.

The speed of injection piston 25 and the back pressure that resists its travel within plunger 24 is also under the control of process computer 18. More particularly, this function is provided by a pressure control valve 40 and a flow control valve 42 in fluid (hydraulic or pneumatic) line 44, both of which are under the control of computer 18. Advantageously, the speed and back pressure may be adjusted even during travel of injection piston 25. This is accomplished by placing the desired speed and pressure parameters in the memory of computer 18, comparing the actual speed and pressure experienced during operation of the injection plunger with the desired parameters, and adjusting valves 40 and 42 as required to bring the actual speed and pressure into alignment with the target speed and pressure.

When limit switch 38 is tripped, indicating that the desired shot is now in the injection barrel, computer 18 activates solenoid 46 which controls mechanical valve 48. That valve, when open, activates hydraulic or pneumatic cylinder 50 through line 52, causing the piston 54 therein to retract (i.e., to travel to the right in FIG. 1). A pin 56 is secured to piston 54 and moves conjointly therewith.

Nozzle 58 slidably receives said pin 56, as perhaps best shown in FIG. 2. Liquid silicone rubber 60 is introduced into said nozzle through conduit 22. Note coolant passages 59 formed in the body of the nozzle; these enable temperature control.

Silicone cannot be discharged from nozzle 58 when pin 56 is advanced as depicted in FIG. 2. More particularly, the discharge port 62 of nozzle 58 is blocked by the leading end of pin 56 when said pin is advanced as clearly depicted in FIG. 2. Thus, retraction of pin 56 (accomplished by removing fluid through line 52 and supplying fluid to the opposite side of pin control piston 54 through line 53) opens discharge opening 62 and liquid silicone rubber is discharged into a heated mold cavity 64.

As mentioned earlier, retraction of pin 56 is caused by left to right (as depicted) travel of piston 54, said travel of said piston 54 being effectuated by mechanical valve 48 which is under the control of solenoid 46 which is under the control of computer 18, all as aforesaid.

When solenoid 46 is activated by computer 18 to retract pin 56, solenoid 16 is simultaneously activated and it reconfigures valve 14 to shut off the flow of liquid silicone rubber from the unillustrated liquid silicone rubber dispensing machine and to simultaneously open the flow from injection barrel 24 to nozzle 58. At the same time, computer 18 activates solenoid 28 which reconfigures mechanical valve 30 so that hydraulic fluid or air enters the cavity 66 of the injection control cylinder 34 to thereby drive piston 36 and hence piston 25 in the direction opposite to directional arrows 26 and 27 to thereby drive the shot in barrel 24 through conduit 22 into nozzle 58 and hence into cavity 64.

Note that there are as many nozzles 58 as there are cavities 64, and that the number of nozzles and cavities may be any desired number. It is critical to also note that for each cavity 64, there is one nozzle 58, one supply conduit 22, one mechanical valve 14, one control solenoid 16, one injection plunger 24 and one control cylinder 34, i.e., each cavity 64 has a complete injection circuit dedicated to it. Moreover, for each cavity 64 there is one mechanical valve 30 and control solenoid 28, and one supply line 44 having pressure control valve 40 and flow control valve 42 therein. In this way, every part of the injection circuit is dedicated to a single cavity, and each part of the injection circuit is under the control of computer 18 without regard to any other injection circuit associated with another nozzle. Thus, the number of cavities and injection circuits is limited only by the memory capacity of process computer 18, and the number of injection circuits and cavities is always equal. Importantly, there are no runners in this novel system.

Conduit 22 is a flexible hose, so as many flexible hoses 22 may be employed as needed. This non-rigid connection between each barrel 24 and its associated nozzle 58 enables the facile installation of as many barrels and nozzles as may be desired.

When injection plunger 24 has completed its charging stroke and a shot has been injected into a cavity 64, timer 68 is initiated by computer 18 and said timer begins to measure a predetermined amount of time. Pin 56 of nozzle 58 is held in its retracted position during the passage of the measured time interval; the shot expands in its heated cavity 64 during this time period. Since pin 56 is retracted, the expanding shot in the cavity may enter the nozzle 58 through discharge port 62. This allows full thermal expansion of the injected shot and thereby results in a high quality part. Each nozzle remains open until its associated charge of mixed component has undergone its complete thermal expansion; this is in sharp and distinct contrast to the manifold designs heretofore known, where some charges might have undergone full thermal expansion and other charges might have not when the charges were ejected from their respective cavities.

At the end of the time period measured by timer 68, solenoid 46 reconfigures valve 48 to close discharge port 62 by causing pin 56 to advance into the position shown in FIG. 2, and timer 70 is activated. That timer measures a period of time equal to a predetermined curing cycle. Thus, thermal expansion will have been completed within each cavity 64 by the time the curing timer is initiated.

Mold 72, which is under the control of clamp cylinder 74 which in turn is controlled by mechanical valve 76 which is under the control of solenoid 78, does not open until all of the shots in all of the cavities 64 have cured. Specifically, note that solenoid 78 is conductively coupled to computer 18 by conductor 80. When all of the curing cycle timers 70 have sent electrical or other suitable pulses to the computer to indicate the expiration of their respective cycles, only then does the computer activate solenoid 78 to effect the opening of mold 72.

The source of hydraulic fluid or air for clamp cylinder 74 and for the other similarly operated cylinders is deleted from the figures to simplify them.

Not only does the novel system increase the quality of the molded parts, it enables the high quality production of difficult-to-make parts in a multi-cavity mold. Heretofore, such difficult-to-make parts required single cavity molds because there was no other way to individually control the crucial parameters relative to size of shot, speed, temperature and pressure of injection, thermal expansion and curing. The ability to make such parts in a runnerless multi-cavity mold, without sacrifice of quality, provides a substantial economic advantage and represents a major breakthrough in the multi-component molding industry.

It is also pointed out that cavities 64 need not be uniform in size and configuration, i.e., differing cavities for making differing products can be installed into the same mold. This, too, is a revolutionary breakthrough.

Similarly, product costs are also substantially lowered because, in the novel machine, more than one mold can be installed in a single molding machine.

As mentioned, the runners present in prior art multi-cavity molding machines are eliminated by the novel design. Since runners are filled with wasted plastic, the novel machine eliminates such waste.

The ability of the novel system to provide high quality parts with less strict tolerances also lowers the cost of molds.

A similar system could also be used for molding thermoplastic by heating the barrels and the nozzles and cooling the molds. Another important variation of this novel system contemplates the use of rotary volumetric dispensers, instead of injection plungers, to meter the amount of material into each cavity. This variation would reduce the space requirements and the cost of the molding machine.

Of course, the mechanical valves disclosed herein may be of many differing types, and they need not be controlled by solenoids. Those skilled in the art of machine design will be able to make numerous substitutions of parts and make other changes to the novel machine without departing from the coverage of this important patent.

This invention is clearly new and useful. Moreover, it was not obvious to those of ordinary skill in the art at the time it was made, in view of the prior art when considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. In a molding machine, comprising:
   a mold having a plurality of cavities;
   a plurality of nozzle members, there being as many nozzle members as there are cavities;
   a plurality of injection plungers, there being as many injection plungers as there are nozzle members;
   a plurality of conduit members, there being as many conduit members as there are nozzle members, each conduit member of said plurality of conduit members being disposed in fluid communicating relation between an associated nozzle member and an associated injection plunger;
   each injection plunger of said plurality of injection plungers being disposed in fluid communication with a source of mixed components and each injection plunger of said plurality of injection plungers being positioned to deliver a predetermined quantity of said mixed components to its associated nozzle member upon being activated; and
   a process computer that activates each of said injection plungers in accordance with a predetermined cycle of operation;
   whereby upon activation of each injection plunger by said computer, a predetermined quantity of mixed components is injected into each of said cavities by said nozzle members, all of said injections being performed independently of each other.

2. The machine of claim 1, further comprising a slidably mounted pin member positioned within each of said nozzle members, each of said pin members having a retracted position opening its associated nozzle member to discharge of said mixed components into its associated cavity and having an extended position closing its associated nozzle member to discharge, and pin control means under the control of said process computer for extending and retracting said pin members in accordance with said predetermined cycle of operation.

3. The machine of claim 2, further comprising a plurality of first timer means under the control of said computer, there being as many of said first timer means as there are nozzle members, each first timer means being operative to maintain its associated pin member in a retracted state for a first predetermined period of time after discharge of said mixed components into an associated cavity so that said mixed components in said associated cavity may enter into an associated nozzle member when said mixed components undergo thermal expansion, said computer being operative to cause said pin members to extend and thereby close their associated nozzle members upon the expiration of said first preselected period of time.

4. The machine of claim 3, further comprising a plurality of second timer means, under the control of said computer, there being as many of said second timer means as there are nozzle members, each of said second timer means being operative to measure a second predetermined period of time commencing upon the expiration of said first predetermined period of time, said pin members remaining in extended configuration throughout the duration of said second period of time, and said process computer being operative to open said mold only upon the expiration of said second predetermined period of time as measured by each of said second timer means;

whereby the mold is not opened until product in each cavity is fully cured.

5. The machine of claim 4, further comprising independent stroke-adjusting means for adjusting the length of the stroke of an injection plunger piston within each of said injection plungers so that the amount of mixed components injected into each of said nozzle members may be preselected.

6. The machine of claim 5, further comprising speed control means under the control of said computer for independently adjusting the speed of travel of each injection plunger piston.

7. The machine of claim 6, wherein said stroke adjusting means includes a plunger control cylinder, a control piston being slidably mounted for reciprocation within said plunger control cylinder, a limit switch engageable by said control piston, said limit switch being adjustable and positionable into a plurality of preselected positions of functional adjustment, and said injection plunger piston being conjointly moveable with said control piston so that the length of the stroke of each injection plunger piston is determined by the positioning of said limit switch.

8. The machine of claim 7, wherein each of said plunger control pistons is in fluid communication with a source of fluid for activating said plunger control pistons, and wherein said means for independently controlling the speed of travel of each of said injection plunger pistons includes a pressure control valve and a flow control valve positioned between each of said plunger control pistons and said source of fluid, said pressure control valve and flow control valve being under the control of said computer.

9. The machine of claim 8, further comprising a three-way valve positioned between said source of mixed components, each of said injection plungers and each of said nozzle members, there being as many of said three-way valves as there are nozzle members, and each of said three-way valves being actuated by an associated solenoid means under the control of said computer.

10. The machine of claim 9, further comprising mold opening means for opening said mold when the predetermined period of time measured by said second timer means has expired, said mold opening means being under the control of said computer.

11. The machine of claim 10, wherein said mold opening means includes a fluid-actuated clamp cylinder having a clamp piston reciprocably mounted therein, a four-way valve for selectively directing fluid into and out of said clamp cylinder on opposite sides of said clamp piston, said four-way valve being activated by a solenoid means under the control of said computer, and said mold being mounted for conjoint movement with said clamp piston.

12. The machine of claim 11, further comprising a pin control cylinder having a pin control piston reciprocably mounted therein, said pin control piston being mounted for conjoint movement with said pin, and fluid-actuated means, under the control of said computer, for effecting selective reciprocation of said pin control piston to thereby control the position of said pin within said nozzle member.

13. The machine of claim 12, wherein said fluid-actuated means includes a four-way valve under the control of a solenoid means which is under the control of said computer, said four-way valve being operative to selectively direct fluid into and out of opposite ends of said pin control cylinder having said pin control piston reciprocably mounted therewithin, said nozzle being mounted for conjoint movement with said pin control piston, and said four-way valve being in fluid communication with a supply line and a return line that are in fluid communication with a source of fluid.

14. The machine of claim wherein each of said conduit members is a flexible hose member.

* * * * *